United States Patent [19]

Yarnell et al.

[11] Patent Number: 4,762,698

[45] Date of Patent: Aug. 9, 1988

[54] METHOD FOR INCREASING FLUOSILICIC ACID RECOVERED FROM WET PROCESS PHOSPHORIC ACID PRODUCTION

[75] Inventors: J. Jay Yarnell; Craig A. Pflaum; Arthur F. Davidson; Harry J. Kuhn, all of Lakeland, Fla.

[73] Assignee: International Minerals & Chemical Corp., Terre Haute, Ind.

[21] Appl. No.: 46,737

[22] Filed: May 7, 1987

[51] Int. Cl.$^4$ .............. C01B 33/08; C01B 25/16; C01B 11/00

[52] U.S. Cl. .................. 423/341; 423/320; 423/321 R; 423/342; 423/472

[58] Field of Search .......... 423/321 R, 320, 341, 423/472, 342, 489

[56] References Cited

U.S. PATENT DOCUMENTS

| | | | |
|---|---|---|---|
| 3,271,107 | 9/1966 | Nickerson et al. | 23/182 |
| 3,615,195 | 10/1971 | Bierman et al. | 423/320 |
| 3,764,658 | 10/1973 | Darwin et al. | 423/321 R |
| 4,083,936 | 4/1978 | Woodward | 423/320 |
| 4,298,586 | 11/1981 | Sikdar | 423/339 |
| 4,308,244 | 12/1981 | Sikdar et al. | 423/339 |
| 4,330,517 | 5/1982 | Michalski | 423/321 |
| 4,540,511 | 9/1985 | McCaffrey et al. | 252/321 |
| 4,613,494 | 9/1986 | Barber | 423/490 |
| 4,626,377 | 12/1986 | Kavchok et al. | 252/321 |

FOREIGN PATENT DOCUMENTS 713828  2/1980  U.S.S.R. .................. 423/320

OTHER PUBLICATIONS

Colton, F. A., J. Chem. Ed., 35(10), 562(1958).

Primary Examiner—Gregory A. Heller
Attorney, Agent, or Firm—Wendell Ray Guffey; Thomas L. Farquer

[57] ABSTRACT

A method is disclosed for increasing the fluosilicic acid (FSA) recovered from a wet process phosphoric acid manufacturing process. The filtrate obtained by washing a filter cake is pumped to a stripper and reacted with $H_2SO_4$ to converting the dissolved FSA to gaseous $SiF_4$. A defoamer is added to the acid-filtrate mixture to reduce the foam produced by the reaction and increase the amount of gaseous $SiF_4$ recovered from the reaction. The gaseous $SiF_4$ is recovered from the acid-filtrate reaction mixture and converted to FSA for commercial use.

4 Claims, No Drawings

METHOD FOR INCREASING FLUOSILICIC ACID RECOVERED FROM WET PROCESS PHOSPHORIC ACID PRODUCTION

This invention relates generally to methods for producing fluosilicic acid (FSA) and particularly to a method for increasing the amount of FSA recovered as a by-product from wet process phosphoric acid manufacturing process.

BACKGROUND OF THE INVENTION

The wet process phosphoric acid manufacturing process generally involves reacting sulfuric acid ($H_2SO_4$) with phosphate rock containing varying quantities of fluoride, silica, and other impurities. The reaction is carried out at elevated temperatures in large attack tanks. The slurry produced by the reaction comprises a liquid phase of mostly impure phosphoric acid and a solid phase containing essentially calcium sulfate crystals but also containing unreacted phosphate rock, calcium fluoride, silica, organic matter and many other impurities.

The slurry stream is filtered to produce about a 28–32% $P_2O_5$ solution to be sold or further processed into the better grades of phosphoric acid. The filter cake produced during the filtration step contains calcium sulfate crystals and a significant quantity of phosphoric acid and other impurities. This cake is washed with water to recover the remaining phosphoric acid and other soluble impurities. The solution, hereinafter called the filtrate, generally has a phosphoric acid concentration of about 20% and contains many soluble impurities, particularly the fluorine and silica produced during the process.

Most prior art methods merely pump the filtrate back to the attack tank for further reaction with phosphate rock and $H_2SO_4$. Other methods have attempted to recover the commercially valuable impurities from the filtrate, particularly FSA. Generally the filtrate is pumped to a stripper where it is mixed with $H_2SO_4$. The reaction between $H_2SO_4$ and the 20% phosphoric acid in the filtrate releases the gaseous silicon tetrafluoride ($SiF_4$) which is drawn into an educator type scrubber where water is added to form the FSA containing excess silica. The solution of FSA and silicate are then separated through filtration. The FSA is used for commercial sales.

Recovery of $SiF_4$ from the stripper is dependent on many factors including the grade of mixing, temperature, flow rates, concentration, types of impurities in the filtrate, and the like. A particularly difficult problem which lowers the amount of $SiF_4$ recovered is the development of foam on the surface of the stripper reaction solution. In the stripper, the agitation and gases produced due to the mixing of the acid and filtrate form a foam which traps the $SiF_4$ and lowers the amount of $SiF_4$ recovered from the acid-filtrate mixture. This lowers the efficiency of the overall process and increases the cost of recovering FSA from the filtrate.

A method is, therefore, needed which can reduce the amount of foam produced by mixing the filtrate and $H_2SO_4$ in the stripper and allow more $SiF_4$ to be recovered from the acid-filtrate mixture. This could increase the efficiency of the process and lower the cost of FSA production.

Defoamers have often been used to suppress foam in the wet process attack tank. For example, U.S. Pat. No. 4,540,511 discloses using a mixture of monocarboxylic acids, a monoalkanolamide, and an alcohol to inhibit foam in the phosphate rock-sulfuric acid medium. U.S. Pat. No. 4,083,936 discloses using phosphate esters of aliphatic alcohols as defoaming agents during the manufacture of phosphoric acid by the acidulation of phosphate rock. U.S. Pat. No. 3,437,437 discloses the use of a hydroxyl amine and fatty acid reaction prior art to control foaming during the production of wet process phosphoric acid. U.S. Pat. No. 4,083,936 discloses using phosphate esters of aliphatic alcohols as anti-foaming compositions during phosphoric acid manufacture. Defoamers have not, however, been used in the filtrate strippers to increase evolution of $SiF_4$ and therefore FSA production.

SUMMARY OF THE INVENTION

It is therefore an object of the present invention to provide a method for increasing the amount of FSA recovered from the filtrate during wet process phosphoric acid manufacture.

It is another object of the present invention to provide a method for decreasing the amount of foam present in the filtrate stripper during wet process phosphoric acid manufacture.

These and other objects are achieved by adding a defoamer to the acid-filtrate mixture to decrease the amount of foam produced by the reaction and thereby increase the amount of $SiF_4$ recovered from the reaction mixture.

Preferably, defoamer is added with the filtrate and the filtrate-defoamer is mixed with the $H_2SO_4$ in the stripper. As a result, less foam is produced and more $SiF_4$ is recovered. Subsequent processing of $SiF_4$ produces FSA for sale as a water additive and the like.

Other objects, advantages, and novel features of the present invention will become apparent from the following detailed description of the invention.

DETAILED DESCRIPTION OF THE INVENTION

According to the present invention, the production of fluosilicic acid (FSA) as a by-product from wet process phosphoric acid production is made more efficient by adding defoamer to the filtrate stripper to decrease the amount of foam produced by the reaction between the filtrate and phosphoric acid. Lowering the amount of foam allows more of the gaseous $SiF_4$ produced by the reaction between $H_2SO_4$ and the filtrate that would be trapped by the foam to be evolved and pumped to the scrubber where it is recovered and converted to FSA. $SiF_4$ recovered by the above method is processed to produce FSA which can be sold as a drinking water additive or starting material for the production of other fluorine containing compounds.

The production of phosphoric acid generally involves filtering a slurry containing dissolved phosphoric acid, calcium sulfate crystals, and dissolved and undissolved impurities such as fluosilicic acid. The filtration process produces phosphoric acid which is sold or further processed and a filter cake which contains phosphoric acid, calcium sulfate crystals, and impurities such as fluosilicic acid. This filter cake is washed to produce a solution containing phosphoric acid and other soluble impurities (hereinafter called the "filtrate"). The filtrate is pumped to a stripper where it is mixed with $H_2SO_4$. The reaction between $H_2SO_4$ and the $P_2O_5$ in the filtrate produces sufficient heat to release fluorine and silica which combine to produce gaseous $SiF_4$. The $SiF_4$ is collected and converted to FSA.

The efficiency of this process is controlled by many factors, particularly the amount of foam produced by the reaction of the strong acids with the organic material and other impurities dissolved in the filtrate. The foam floats on the surface of the solution in the stripper and lowers the amount of the gaseous $SiF_4$ recovered and pumped to the scrubber thereby lowering the efficiency of the overall process. The present invention comprises a method wherein defoamer is added to the stripper solution to reduce the amount of foam on the surface of the solution thereby permitting gaseous $SiF_4$ to evolve to the scrubber and subsequently be converted to FSA.

Defoamer is added directly to the stripper solution or added to the filtrate prior to mixing in the stripper tank. Preferably, the defoamer is added to the filtrate prior to addition to the stripper tank. Adding defoamer to the filtrate insures that the defoamer will be uniformly distributed in the acid-filtrate mixture and makes it easier to control the amount of defoamer used in the process.

The defoamer is added to the stripper solution or the filtrate at a rate of from about 0.3–3.0 milliters defoamer per gallon filtrate, preferably from about 0.8–2.5 milliters defoamer per gallon filtrate. Typically the defoamer is added to the stripper solution at a rate of about 10–200 ml per minute (ml/min) when the filtrate rate is about 80–160 gallons per minutes (gal/min) and the $H_2SO_4$ rate is about 40–100 gal/min. Obviously these rates and ratios can vary depending on the defoamer and the type and capacity of the stripper and other equipment used to produce the FSA and phosphoric acid.

Conventional defoamers used to reduce foam in the attack tank function well in the present invention. Defoamers usable in accordance with the present invention include the materials sold by Basso Chemicals, Inc. of Jacksonville Fla. under the tradename Surex 960 and by Westvaco Custom Chemicals of Mulberry Fla. under the tradename Westvaco CC 808 and Westvaco CC 800. Other suitable defoamers include all similar types, many of which are well known to skilled artisans.

EXAMPLE 1

Westvaco CC 808 defoamer was added to the filtrate in the ratios shown in Table I prior to mixing with $H_2SO_4$ at the stripper. The results are shown in Table I.

Referring to Table I, the evolution of fluorine is increased in a conventional stripper and in a spray stripper by the addition of defoamer to the stripper. The fluorine stripping efficiency ratio is increased by over 7% for conventional strippers.

TABLE I

| PhosAcid: $H_2SO_4$ | Fluorine Stripping Efficiency Ratio | | | |
|---|---|---|---|---|
| | Conventional | | Spray | |
| | No Defoamer | Defoamer | No Defoamer | Defoamer |
| 1.63 | 36.1% | 44.2% | | |
| 1.75 | 37.9% | 45.9% | | |
| 1.60 | | | 43.7% | 46.3% |
| 1.78 | | | 40.9% | 51.0% |

EXAMPLE 2

Tests were conducted to compare the use of defoamer versus no defoamer in the stripper. The defoamer used was Westvaco 808. Additions of 0, 100, and 200 ml/minute of defoamer were made to the stripper under various feed conditions. The feed rates, amount of defoamer added, % recovery, and the like are shown in Table II. Referring to Table II, stripper evolution was lowered by as much as 20% without the use of defoamer. Addition of 100 ml/minute defoamer at a #2 filtrate flow rate of 140 GPM produces satisfactory results.

TABLE II

| Defoamer Added ML | $H_2SO_4$ GPM | #2 Filtrate GPM | #2 Filtrate $P_2O_5$ | #2 Filtrate F | Stripper Discharge $P_2O_5$ | Stripper Discharge F | Percent Recovery | Evolution[1] Factor |
|---|---|---|---|---|---|---|---|---|
| 100 | 60 | 100 | 20.35 | 2.04 | 11.37 | 0.59 | 48.2 | 80.4 |
| 0 | 60 | 100 | 20.35 | 2.04 | 11.23 | 0.62 | 44.9 | 74.9 |
| 100 | 60 | 100 | 22.95 | 2.15 | 13.33 | 0.74 | 43.9 | 73.2 |
| 0 | 60 | 100 | 22.95 | 2.15 | 13.33 | 0.82 | 34.3 | 57.2 |
| 100 | 80 | 130 | 22.99 | 2.07 | 12.75 | 0.64 | 44.2 | 71.8 |
| 0 | 80 | 130 | 22.99 | 2.07 | 12.17 | 0.70 | 36.1 | 58.7 |
| 200 | 80 | 120 | 21.28 | 1.89 | 11.01 | 0.52 | 46.8 | 70.2 |
| 200 | 80 | 130 | 21.28 | 1.89 | 11.15 | 0.54 | 45.5 | 73.9 |
| 200 | 80 | 140 | 21.28 | 1.89 | 12.21 | 0.60 | 44.7 | 78.2 |
| 200 | 80 | 140 | 20.53 | 1.91 | 11.47 | 0.58 | 45.6 | 89.8 |
| 100 | 80 | 140 | 20.53 | 1.91 | 11.91 | 0.60 | 45.9 | 80.2 |
| 0 | 80 | 140 | 20.53 | 1.91 | 11.95 | 0.69 | 37.9 | 66.4 |

[1] Evolution factor is calculated as follows: Evolution factor = (% Recovery) × (GPM #2 Filtrate/GPM $H_2SO_4$)

What is claimed is:

1. In a method for increasing the fluosilicic acid (FSA) recovered from a wet process phosphoric acid manufacturing process wherein the filtrate obtained by washing the filter cake is pumped to a stripper and reacted with $H_2SO_4$ thereby converting the FSA dissolved in said filtrate to gaseous $SiF_4$, said gaseous $SiF_4$ being recovered from the acid-filtrate reaction mixture and converted to FSA, the improvement comprising:
   adding a defoamer to said acid-filtrate mixture thereby reducing the foam produced by said reaction and increasing the amount of gaseous $SiF_4$ recovered from said reaction.

2. The method of claim 1 wherein said defoamer is added to said filtrate before said filtrate is mixed with said acid.

3. The method of claim 1 wherein said defoamer, said acid, and said filtrate are mixed at a rate of from about 0.3–3.0 milliters defoamer per gallon filtrate.

4. The method of claim 1 wherein said defoamer, said acid, and said filtrate are mixed at a rate of form about 0.8–2.5 milliters defoamer per gallon filtrate.

* * * * *